US010278892B2

(12) United States Patent
Benda et al.

(10) Patent No.: US 10,278,892 B2
(45) Date of Patent: May 7, 2019

(54) PRINTED SHIELD WITH GROUNDED MATRIX AND PASS THROUGH SOLDER POINT SYSTEMS AND METHODS

(71) Applicants: Steven John Benda, Cokato, MN (US); Chad Matthew Benda, Cokato, MN (US); Ragis H. C. Kao, Taipei (TW)

(72) Inventors: Steven John Benda, Cokato, MN (US); Chad Matthew Benda, Cokato, MN (US); Ragis H. C. Kao, Taipei (TW)

(73) Assignee: TYLOHELO INC., Cokato, MN (US)

( * ) Notice: Subject to any disclaimer, the term of this patent is extended or adjusted under 35 U.S.C. 154(b) by 704 days.

(21) Appl. No.: 14/818,804

(22) Filed: Aug. 5, 2015

(65) Prior Publication Data

US 2015/0382405 A1 Dec. 31, 2015

Related U.S. Application Data

(63) Continuation-in-part of application No. 13/837,087, filed on Mar. 15, 2013, now abandoned, and a (Continued)

(51) Int. Cl.
*H05B 3/26* (2006.01)
*A61H 33/06* (2006.01)
(Continued)

(52) U.S. Cl.
CPC ......... *A61H 33/063* (2013.01); *A61H 33/066* (2013.01); *F24D 13/02* (2013.01);
(Continued)

(58) Field of Classification Search
CPC ....... A61H 33/063; A61H 33/066; F24C 7/04; F24D 13/02; H05B 2203/032; H05B 3/16; H05B 3/20; Y02B 30/26; Y10T 29/49083
See application file for complete search history.

(56) References Cited

U.S. PATENT DOCUMENTS 4,485,297 A * 11/1984 Grise .................... H05B 3/565
219/528
5,811,767 A * 9/1998 Wildi ..................... H05B 3/56
219/213
(Continued)

*Primary Examiner* — Ibrahime A Abraham
*Assistant Examiner* — Frederick F Calvetti
(74) *Attorney, Agent, or Firm* — Device Patent LLC

(57) ABSTRACT

An infrared (IR) heating panel system comprising a thermally and electrically insulating substrate, a power buss, an at least one substrate supported IR heating element electrically coupled to the power buss, and a return element electrically coupled to the power buss and IR heating element. A printed shield substantially covers the IR heating element(s). The heating panel emits radiation when an electrical current is passed therethrough. The printed shielding layer is electrically coupled to a low impedance grounding matrix and configured to harness and shunt electrical field charges emitted by the IR heating element. Some embodiments include two or more IR heating panels coupled in an electrical parallel configuration supplied by one twisted and shielded power feed wire. Twisted two-wire shielded plus ground conductors are soldered to the corresponding IR heater solder points while simultaneously maintaining the twisted wire configuration for EMR cancellation and EF grounding shield conductivity.

20 Claims, 12 Drawing Sheets

Related U.S. Application Data continuation-in-part of application No. 13/665,040, filed on Oct. 31, 2012, now Pat. No. 9,788,367.

(60) Provisional application No. 62/230,122, filed on May 27, 2015, provisional application No. 61/999,790, filed on Aug. 5, 2014.

(51) Int. Cl.
| | |
|---|---|
| *H05B 3/16* | (2006.01) |
| *F24D 13/02* | (2006.01) |
| *H05B 3/20* | (2006.01) |
| *F24C 7/04* | (2006.01) |

(52) U.S. Cl.
CPC ............... *H05B 3/16* (2013.01); *H05B 3/20* (2013.01); *F24C 7/04* (2013.01); *H05B 2203/032* (2013.01); *Y02B 30/26* (2013.01); *Y10T 29/49083* (2015.01)

(56) References Cited

U.S. PATENT DOCUMENTS

| | | | |
|---|---|---|---|
| 6,944,393 B1* | 9/2005 | Stabile | F24D 13/022 219/542 |
| 8,692,168 B2* | 4/2014 | Benda | A61H 33/063 219/213 |
| 9,788,367 B2* | 10/2017 | Benda | H05B 3/06 |
| 2003/0156831 A1* | 8/2003 | Schaeffer | A61N 5/06 392/416 |
| 2003/0178415 A1* | 9/2003 | Hays | H05B 3/56 219/552 |
| 2005/0139370 A1* | 6/2005 | Whidden | H01B 9/029 174/34 |
| 2007/0182498 A1* | 8/2007 | Zumoto | H05G 2/00 331/83 |
| 2011/0081135 A1* | 4/2011 | Felder | A21C 15/002 392/407 |
| 2011/0315672 A1* | 12/2011 | Benda | A61H 33/063 219/385 |

* cited by examiner

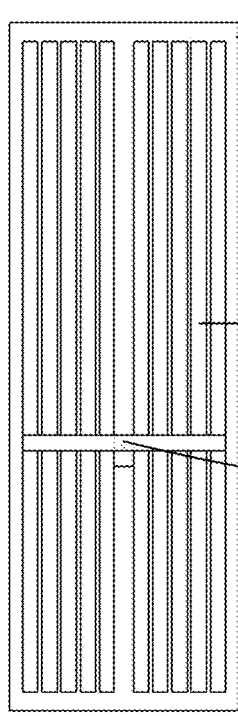
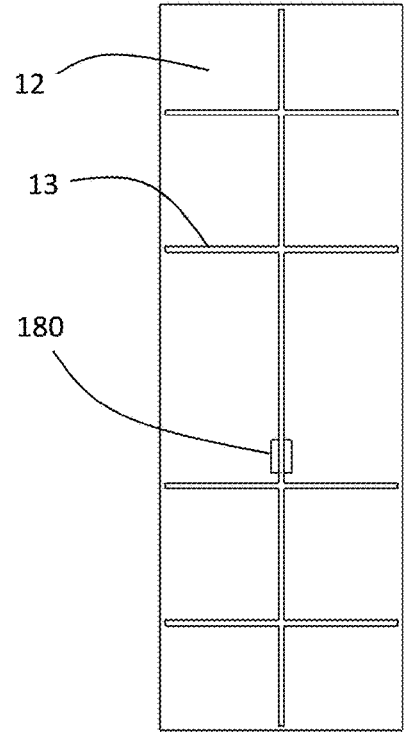
FIGURE 11
FIGURE 12
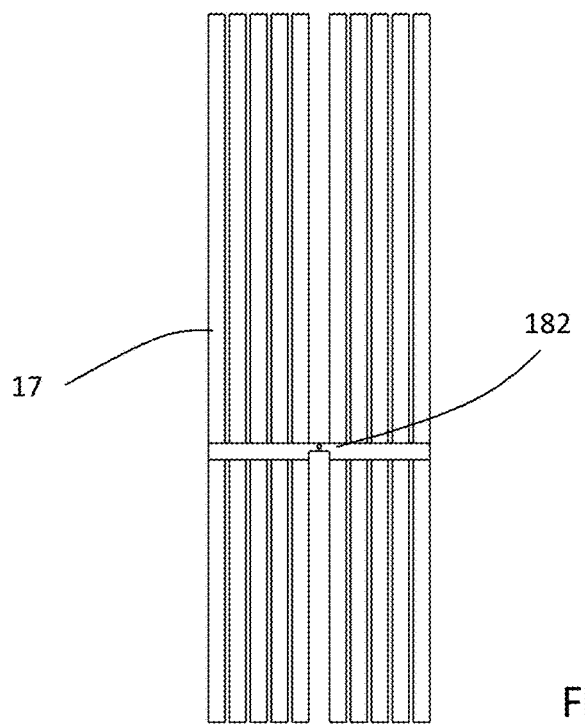
FIGURE 13

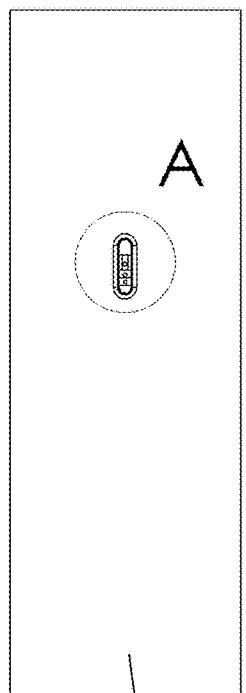
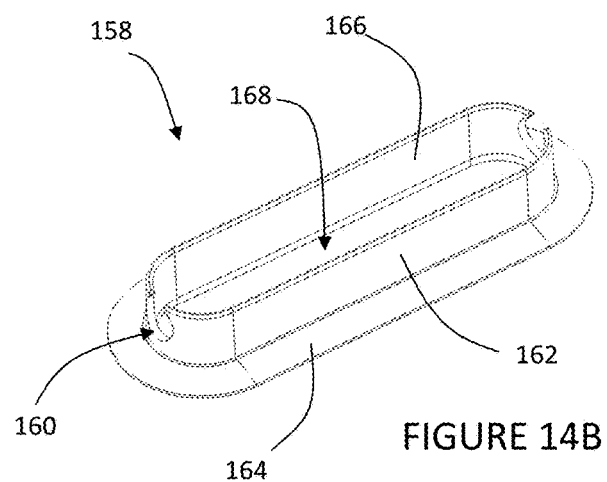
FIGURE 14
FIGURE 14B
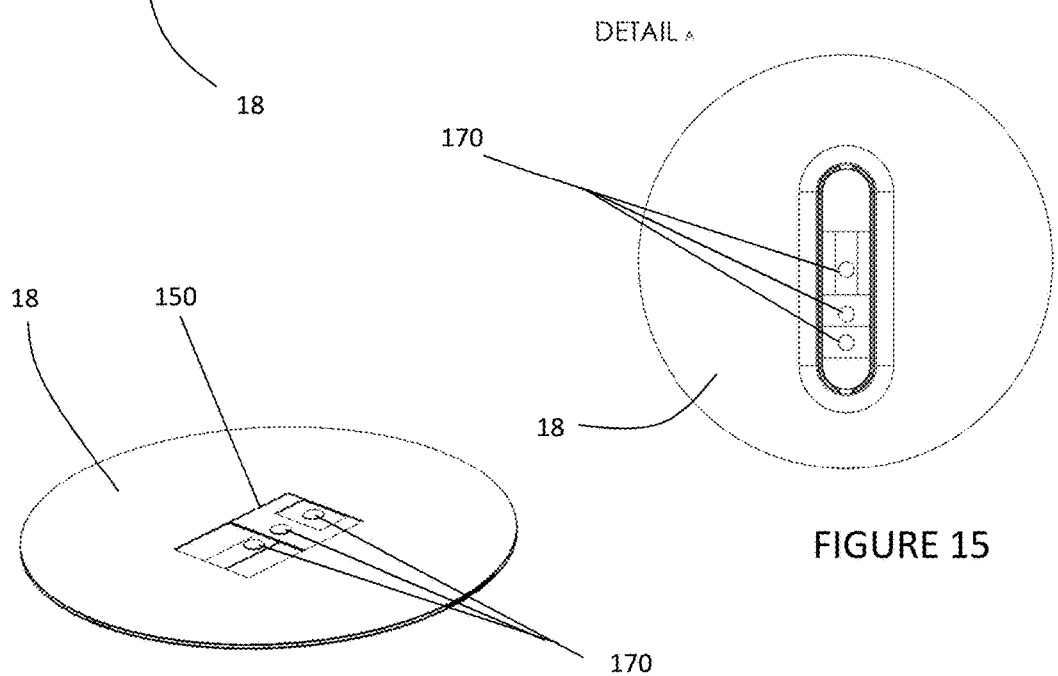
FIGURE 16
FIGURE 15

PRINTED SHIELD WITH GROUNDED MATRIX AND PASS THROUGH SOLDER POINT SYSTEMS AND METHODS

CROSS REFERENCE TO RELATED APPLICATIONS

This application is also a continuation in part of application Ser. No. 13/837,087 filed Mar. 15, 2013 and application Ser. No. 13/665,040 filed Oct. 31, 2012 the entire contents of which are hereby expressly incorporated by reference herein.

This application also claims the benefit of U.S. Provisional Patent Application No. 61/999,790 filed Aug. 5, 2014, and U.S. Provisional Patent Application No. 62/230,122 filed May 27, 2015, and U.S. Utility application Ser. No. 13/837,087 filed Mar. 15, 2013, and U.S. Utility application Ser. No. 13/665,040 filed Oct. 31, 2012, and CA Application No. 2,813,340 filed Apr. 18, 2013, and Europe Application No. 13169699.9 filed May 29, 2013, and CA Application No. 2794059 filed Oct. 31, 2012, and Europe Application No. EP12190904.8 filed Oct. 31, 2012, the entire disclosures of which are hereby incorporated by reference and relied upon.

BACKGROUND

Technical Field

The invention relates generally to infrared heating elements with EF (electric field) shields and more particularly to infrared heating elements with EF shields including low EMR (electromagnetic radiation) and low EF pass-through solder points.

Sauna systems throughout history have employed various systems and methods of heating a space to provide the therapeutic and cleansing effects of heat. Heat causes the human body to perspire and can also provide soothing and therapeutic effects to muscles and joints. Known systems for heating a sauna have included using open fires, enclosed stoves, and steam generators among others. While these systems have had varying degrees of effectiveness, each has further been found to present drawbacks. For example, systems using open fires, while providing direct open-flame radiant heating, result in smoke-filled sauna rooms. Additionally, the heat created from such open fires is often short lived or requires continuous consumption of combustible materials. On the other hand, wood stoves have been found to enable a more controlled heat over a greater period of time but also shield the heat due to the a nature of the stoves.

Over time, sauna systems have evolved to utilizing electrically-energized heaters. Examples of these include electrically-resistive heaters and energized radiant heaters. Some types of radiant heat systems have been designed to employ infrared (IR) heating panels to generate electromagnetic radiation within the infrared spectrum. When absorbed by the body of a sauna user, the IR radiation excites the molecules within the body to generate warming. Whereas steam or warm air is generally found to only heat the skin and tissue directly underneath via conduction, IR radiation more deeply penetrates the body (e.g., to about 1.5 inches) to more effectively and comfortably warm the body to a sweating temperature without the use of conductive mediums.

An electromagnetic (EM) field contains both electric fields and magnetic fields interacting together and are generated by passing electric current through a conductor motivated by voltage present thereon. Electric fields stem from electric charges. Their field intensity is typically measured in Volts/meter. Magnetic fields are caused by an electric current of moving charges with field or flux density typically measured in gauss. The term electromagnetic radiation (also EMR) is sometimes used to refer to EM fields radiating through space apart from their source.

Radiant heating systems are generally powered by conventional alternating current (AC) power sources, such as 110 volt, 60 Hz AC in the United States or 230 volt, 50 Hz AC in Europe. Such heating systems thus tend to generate some amount of low frequency (e.g., 50-60 Hz) electromagnetic radiation in addition to the desired IR radiation utilized for heating. It has been estimated that in some cases, IR sauna systems may generate low frequency EM radiation with magnetic field levels as high as 60 milligauss. In comparison, areas under high voltage transmission lines have been measured with low frequency magnetic field levels as high as 1.9 milligauss and outdoor areas in open spaces have been measured with low frequency magnetic field levels as low as 0.3 milligauss. In addition to the magnetic components of EM radiation, electric field components may also be emitted from infrared sauna systems.

Concerns about high levels of low frequency radiation have led to multiple attempts at reducing the level of low frequency EM radiation in heating systems and saunas, including IR heating systems used in saunas. These include increasing the distance from the emitting source and reducing the exposure time to the radiation level. In addition, attempts have also been made to reduce the level of low frequency EM radiation through EM cancellation schemes, such as by producing multiple low frequency EM fields that tend to cancel one another.

As is further known, the electric fields (EF) generated by a voltage in the system can be reduced by isolating the user from the voltage by strategic placement of a grounded shield. An effective EF shield must incorporate an adequate grounded conductive matrix such that the grounded plane between the user and the electric field provides sufficient shielding to the user. This disclosure will teach a unique and effective means for creating this low cost EF shield.

SUMMARY OF THE INVENTION

Embodiments of the present invention relate to infrared (IR) systems for saunas, with such systems involving one or more infrared heating panels. Each panel is configured to include a substrate, and an IR heating element supported by the substrate. When energized, the heating element emits IR radiation. A return element is also supported by the substrate and generally forms a circuit with the IR heating element. One goal of the present invention is to reduce or eliminate the emission of electric fields into the sauna from the heating panels, in particular the IR heating element and at points of electrical coupling of the panels. Electric fields can be reduced or eliminated by a conductive shielding layer electrically coupled to earth ground and disposed between the source of the electric field and the area of desired field reduction. FIG. 1 illustrates an example of an IR heating panel generating an electric field in an unblocked configuration. Connected to the polar terminals of the heating element is a power source. The active heating element emits infrared heat and an electric field illustrated in the Figure as elongated arrows. An area defined by the dotted line is a zone inaccessible to users. As illustrated in the Figure, the electric field extends beyond the inaccessible area to other areas accessible to nearby users. This configuration is unable to protect the user from the dangers associated with exposure to the electric field.

FIG. 2 illustrates an example of an IR heating panel generating an electric field in a blocked configuration consistent with the disclosed invention. Again connected to the polar terminals of the heating element is a power source. In this configuration, the IR heat generated by the heating element moves out to zones accessible by the user such as the interior of a sauna. The grounded shield matrix however, effectively blocks the electric field thereby preventing a vast majority of the electric field from moving past the grounded shield matrix and thereby preventing the field from moving into zones accessible by a user such as the interior of a sauna. This is illustrated further in FIG. 3 wherein the inside of the cube represents the inside of a space accessible to a user. The cube may represent a simple sauna. Similar to the example of FIG. 1, the electric field is unblocked and extends into interior portions of the sauna. In FIG. 4 the grounded shield limits the electric field thereby preventing the electric field from entering an area accessible by a user. The user in this example is unharmed by electric fields with sauna use.

The electric infrared heater comprises one or more heating panels. As illustrated above, the heater is powered by providing a voltage to an electric line at one end of the heater and returning the current through a return electrical line below it. This causes both electrical lines to have a net charge relative to their surroundings. To explain further, an electric field is present when a charge is present without a corresponding opposing charge. This phenomenon can be described by applying Gauss's law, which states The net electric flux through any closed surface is equal to $1/\varepsilon$ times the net electric charge enclosed within that closed surface. The electric flux is defined as a measure of the flow of the electric field through a given area. In other words, when the net charge within a space is neutral, or there is no charge, the electric field outside of that region becomes zero. This principle is seen in parallel plate capacitors where the electric field resides fully between the plates of the capacitor.

An electric field is created between two opposing charges that is additive, and when the charges are the same, subtractive. To further describe the field in a room, consider a surface just outside of the room as the arbitrary surface. In a building, the walls, floors and ceilings are bonded together, and have a charge that could be considered to be static. When a heater is introduced, an element is added to the room that moves net electric charge into the enclosed surface. This will produce an electric field between the added surface (the heater), and the room structure itself. It is desirable to provide an object that will negate the effects of the net charge addition by providing the opposite charge to counter harmful emissions as. To do this, a shield is introduced in close proximity to the heater as illustrated previously in FIGS. 2 and 4. In this disclosure, the net charge is negated by implementation of a printed conductive ink with copper bussing and tie provisions to the local ground of the room. When this ground is applied, a surface that has the same charge as the room is introduced in the immediate vicinity of the heater panel, and thus the total electric field is contained between the heater and the shielding panel. Outside of this space, the net electric field is zero with respect to contribution from the heater panel.

Novel use of shielding of infrared panels is embodied here. Shielding may be printed directly onto the panel or substrate for position atop the IR heating elements so as to reside between the heating element and spaces that may be occupied by a user. The shielding may be connected to earth ground in order to prevent the buildup of electrical charge or the flow of semi induced electrical currents there through. Printing of a semi conductive shield having a resistivity greater than metals such copper or aluminum over a non-conductive substrate produces an EF shield of variable effectiveness. This disclosure also teaches methods to create a semi-conductive printed shield that exhibits a uniform and substantial EF shield along the entire surface of exposure.

In some embodiments, an IR heating panel as may be used for a sauna is provided. Aside from the heating and shielding portions of the panel, the panel comprises; a power feed portion to provide power, a supply portion to channel the power to the panel, a connection portion to couple the supply portion to various portions of the panel, and in some cases an extension portion for reducing EF near the connection portions.

The panel may comprise a plurality of material layers such as illustrated in FIG. 5 as well as features for attachment of electrical conductors. Some layers may include thermally and electrically insulating substrates such as may be used for printed circuit boards (PCBs) such as FR-4. The panel may also comprise various forms of busses for distribution of electricity such as a power buss, a grounding buss, or other electrical busses. Other components of the IR heating panel may include; at least one IR heating element electrically coupled to a power buss and supported by the substrate, at least one return element electrically coupled to the power buss and the at least one IR heating element, and a shielding layer substantially covering the at least one IR heating element. The at least one IR heating element is configured to emit IR radiation when an electrical current is passed there through.

The IR heating elements and return elements (layer 5 and 7 in FIG. 5) form a circuit with the power buss, wherein electrical power provided to the circuit causes at least one IR heating element to emit IR radiation. The shielding layer (layer 2 in FIG. 5) is arranged such that the IR heating elements and power buss are disposed between the shielding layer and the substrate (layer 4 in this example). The shielding layer is electrically coupled to ground and configured to harness and shunt electric field charge emitted by the power buss or the IR heating elements.

The return element (illustrated as example as layer 7 in FIG. 5) is further supported by the substrate and is substantially parallel with and proximate to the at least one IR heating element. The shielding layer is arranged such that the at least one IR heating element is disposed between the shielding layer and the substrate. The shielding layer is electrically coupled to ground and configured to harness and shunt electrical field charge emitted by the at least one IR heating element. The EF shield in this embodiment is a semi-conductive printed shield substantially covering the electrically energized IR heater circuits and associated buss work thereby blocking nearby users from electric field emissions. The printed shielding layer is printed over a less-than substantial covering low resistive conduction matrix. This conductive matrix can be comprised of for example, a matrix of thin copper strips.

The IR heating element has a higher electrical resistance than the return element. However, in alternative embodiments the return element may be configured to include resistive materials wherein the return element may also generate IR radiation. In this case the printed shielding layer is configured to shunt electrical field charges emitted from the IR heating element and the return element. In some embodiments a second shielding layer may be positioned between the return element and the substrate for shunting electrical field charges emitted by the IR heating element.

In a further embodiment, a method for producing an IR heating panel for a sauna is provided. The method comprises providing a thermally and electrically insulating substrate; coupling to the substrate at least one IR heating element, a return element associated with the at least one IR heating element, and a power buss such that the at least one IR heating element, return element and power buss are supported by the substrate; electrically coupling the at least one IR heating element and return element to the power buss such that, as electrical power is applied to the power buss, an electrical current flows through the at least one IR heating element, causing it to emit IR radiation, and back through the return element; and applying, to the substrate, a shielding layer that is disposed between the substrate and the printed shielding layer and electrically coupled to ground, such that electric field charges emitted from the at least one IR heating element are harnessed and shunted by the printed shielding layer.

Some embodiments that will be described herein generally provide power feeds, power feed connections, heating panels, saunas, and/or methods relating to design configurations that can in some cases reduce the electromagnetic field emissions emanating from the power connection to an electric heating panel.

According to one aspect, an electrically-powered heating panel is provided. The heating panel includes a substrate and at least one heating element positioned on the substrate. The heating panel also includes a first terminal electrically coupled to the at least one heating element and a second terminal electrically coupled to the at least one heating element. The second terminal is in some cases positioned adjacent to the first terminal on the substrate. The heating panel further includes a power feed that can be described as including a supply portion, a connection portion, and an in some cases an extension portion. Directing power from a power source, the supply portion includes a first insulated conductor and a second insulated conductor, with the conductors having a twisted configuration about each other. The connection portion includes a first electrical coupling between the first insulated conductor and the first terminal and also includes a second electrical coupling between the second insulated conductor and the second terminal. These connections may be in the form of solder points wherein the conductor is soldered to the terminal. The extension portion includes one or more insulated conductors also in a twisted configuration. The extension portion conductors extend over the substrate away from the first and the second terminals such that current flows in opposite directions through the extension portion in order to reduce electromagnetic field emissions generated by the power feed. A thermal switch may interrupt the extension portion causing an open circuit if excessive heat is generated.

According to another aspect, a heating panel for an infrared sauna is provided. The heating panel, also referred to as an infrared heating panel, includes a substrate and at least one infrared heating element positioned on the substrate. The infrared heating element is configured to provide heat for a user of the infrared sauna. A first terminal of the heating panel is electrically coupled to the at least one infrared heating element, as is a second terminal. The heating panel includes first and second insulated conductors for providing power to the at least one infrared heating element. The first insulated conductor is electrically connected to the first terminal at a first connection point. The second insulated conductor is twisted about the first insulated conductor and in some embodiments is electrically connected to an extension conductor portion. The extension conductor portion includes an insulated conductor extending past the second terminal. The heating panel further includes a return conductor portion that is electrically coupled to the extension conductor portion. The return conductor portion includes an insulated conductor returning back to and being electrically connected to the second terminal at a second connection point. In addition, the return conductor portion is twisted about the extension conductor portion.

According to another aspect, a method for providing a power connection to a heating panel of a sauna is provided. The method includes providing a heating panel and a power feed. The heating panel includes a substrate, at least one heating element, and first and second terminals electrically coupled to the at least one heating element. The power feed includes a first insulated conductor, a second insulated conductor in a twisted configuration with the first insulated conductor, an extension conductor portion electrically connected to the second insulated conductor, and a return conductor portion electrically coupled to the extension conductor portion. The return conductor portion is twisted about the extension conductor portion. The method further includes electrically connecting the first insulated conductor to the first terminal and extending the extension conductor portion across the substrate past the second terminal. The method also includes returning the return conductor portion across the substrate to the second terminal and electrically connecting the return conductor portion to the second terminal.

Some embodiments may optionally provide none, some, or all of the following advantages, though other advantages not listed here may also be provided. In some cases, one or both of an extension conductor portion and/or return conductor portion of a power feed may be an integral portion of one of the insulated conductors providing power to the heating panel. In some cases, the return conductor is instead a separate insulated conductor physically connected to the end of the extension conductor. In some cases, the return conductor portion can be made by cutting off a portion of one of the insulated conductors of the power feed, twisting the portion about the extension conductor portion, electrically connecting the portion to the end of the extension conductor portion, and electrically connecting the opposite end of the portion to the second terminal.

According to some embodiments, an extension portion of a power feed can include a thermal switch or a thermal breaker such as a thermal circuit breaker, whose leads may in some cases form all or part of one or more of extension conductor and return conductor portions of the extension portion. In some cases, such an extension portion and thermal switch can extend over the substrate between the terminals and the at least one heating element, and the thermal switch can be positioned on or affixed to the at least one heating element.

According to some embodiments, a heating panel may include a containment system that contains one or more portions of the power feed and/or connections to the heating panel and secures them to a substrate of the heating panel. In some cases the containment system includes a shell made from a nonconductive material such as a polymer. The containment system may also include a nonconductive filling within the shell to adhere the shell and power feed to the heating panel substrate. For example, in some cases, the nonconductive filling may include an insulating adhesive.

According to some embodiments, a power feed bringing power to a heating panel can include first and second insulated conductors and an uninsulated ground conductor in a twisted configuration. In some cases a metallic shielding surrounds the first and second insulated conductors and the uninsulated ground conductor. An insulating jacket can also surround the metallic shielding assembly.

This patent application furthers the technology to teach solder point technology that enables multiple IR heaters to be electrically coupled in parallel to a single power wire while still maintaining the Low EMR and Low EF heater qualities and attributes.

As illustrated by example in FIG. 6, the technology taught in this disclosure provides a method of electrically coupling two or more IR heating panels together in parallel. In this configuration, at least the first (but not the last) IR heater is connected by a specific pass-through solder point and configured to cause electrical magnetic radiation (EMR) to be minimized through electrical cancellation techniques. The specific solder point taught in this disclosure provides a unique means for a single power feed conductor to supply voltage and current to multiple IR heaters configured in parallel along the same power feed conductor. In most embodiments the conductor is in the form of a wire. This is illustrated further in FIG. 6 wherein a single twisted pair of conductor wires and shield cable extend from a power source and joined along their length to electrical terminals of one or more pass through heater panels. The twisted pair terminates on electrical terminals at a final (end of the line) heater panel. The twisted pair passes through heater panels prior to the terminal panel. For these pass through panels, other techniques are utilized to provide EMR cancellation. The extension techniques disclosed earlier however may be effectively used on the terminal panel with or without a thermal switch.

These and other aspects and features of the invention will be more fully understood and appreciated by reference to the appended drawings and the description of the preferred embodiments.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 11 is a front view of a preferred embodiment of an IR heating element used in the heating panel illustrated in FIG. 8

FIG. 12 is a front view of a preferred embodiment of a grounded matrix used in the heating panel illustrated in FIG. 8.

FIG. 13 is a front view of a preferred embodiment of a grounded matrix used in the heating panel illustrated in FIG. 8.

FIG. 14 is a back view of the heating panel illustrated in FIG. 8 illustrating a shell surrounding the panels solder points.

FIG. 14B is a top perspective view of a preferred embodiment of a shell.

FIG. 15 is a detailed view of the panel of FIG. 14 further illustrating a shell and exposed solder points viewable through the shell.

FIG. 16 is a back close up perspective view of one portion of the heating panel of FIG. 14 with the shell removed to better illustrate the exposed busses and associated solder points.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives. Where applicable, like reference numbers will be used for like components, though like components need not be identical from embodiment to embodiment.

Figure 1:
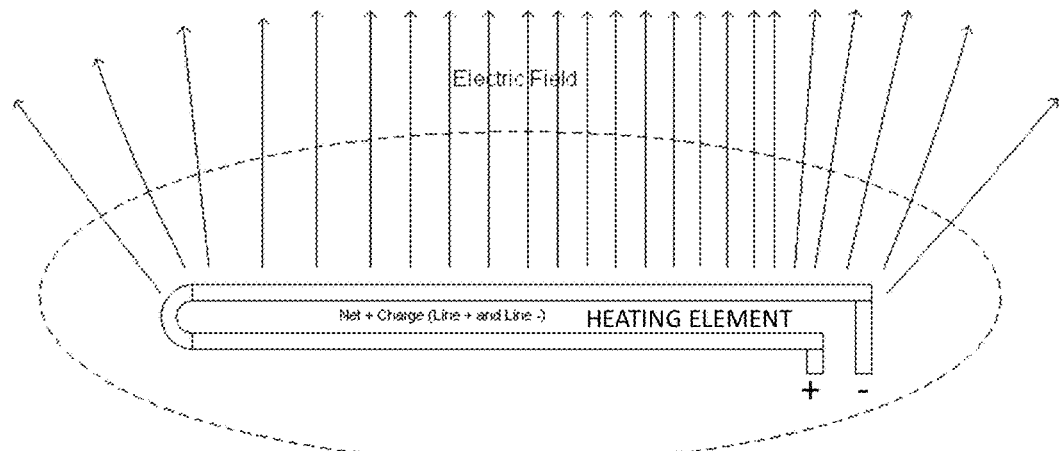
FIG. 1 is an illustration of an electric field extending into areas accessible by users.
Figure 2:
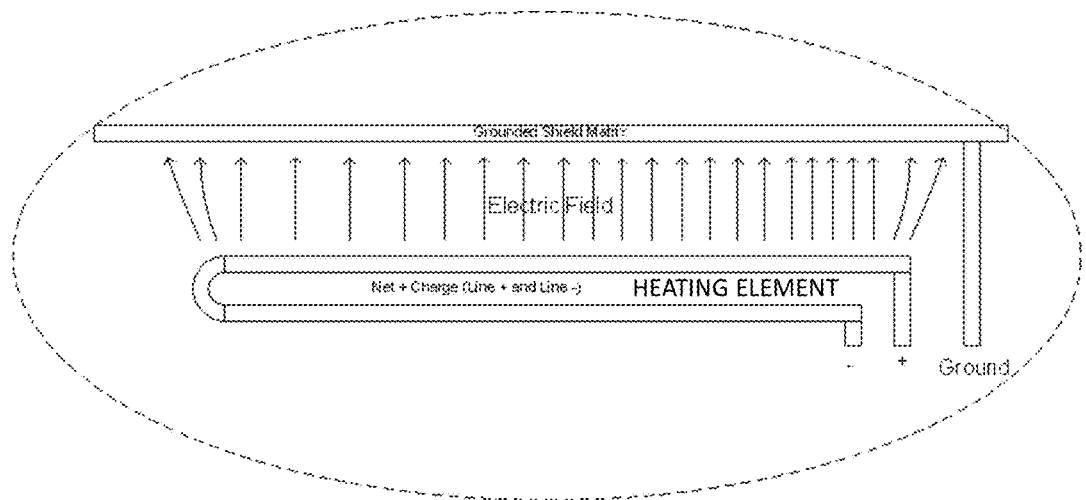
FIG. 2 is an illustration of an electric field blocked by a grounded shield matrix and thus unable to extend into areas accessible by users.
Figure 3:
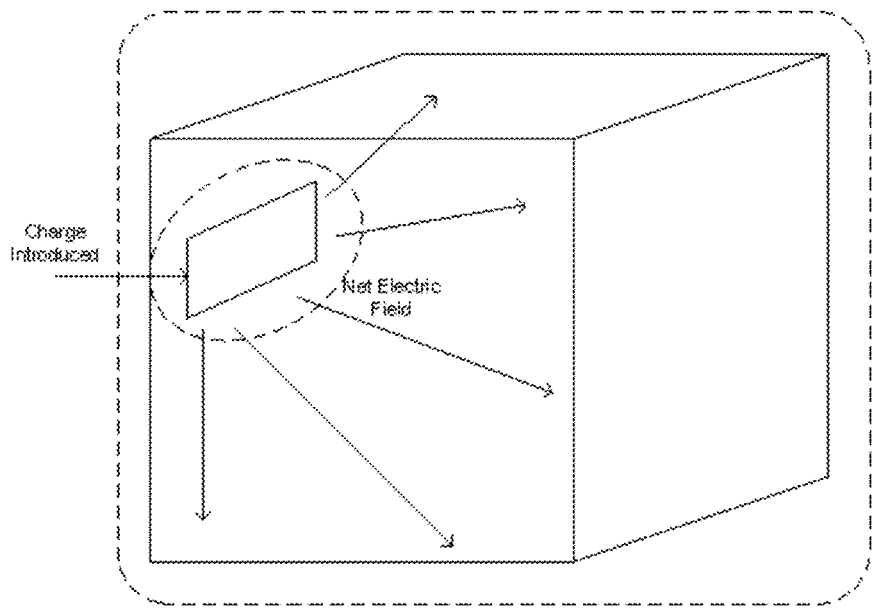
FIG. 3 is an illustration of an electric field extending into areas accessible by users in this case the inside of a cube representing the inside user space of a sauna.
Figure 4:
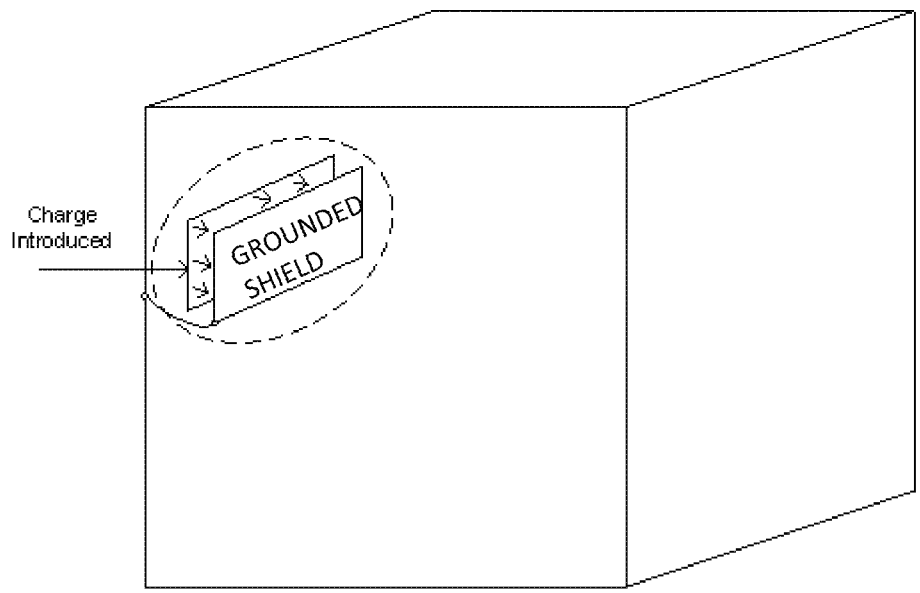
FIG. 4 is an illustration of an electric field blocked by a grounded shield matrix and thus unable to extend into areas accessible by users in this case the inside of a cube representing the inside user space of a sauna.
Figure 7:
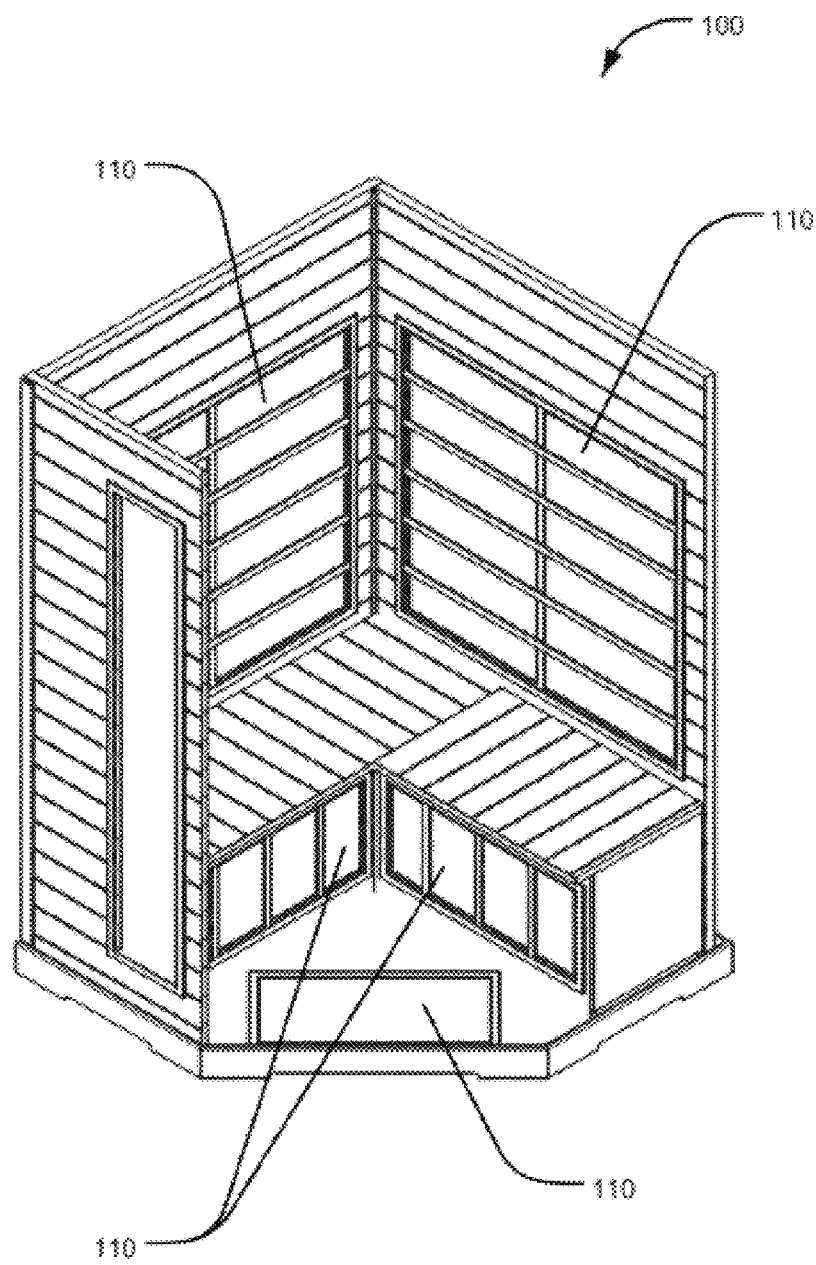
FIG. 7 is an illustration of one embodiment of a sauna utilizing a plurality of IR heating panels for heating the inside.
Figure 8:
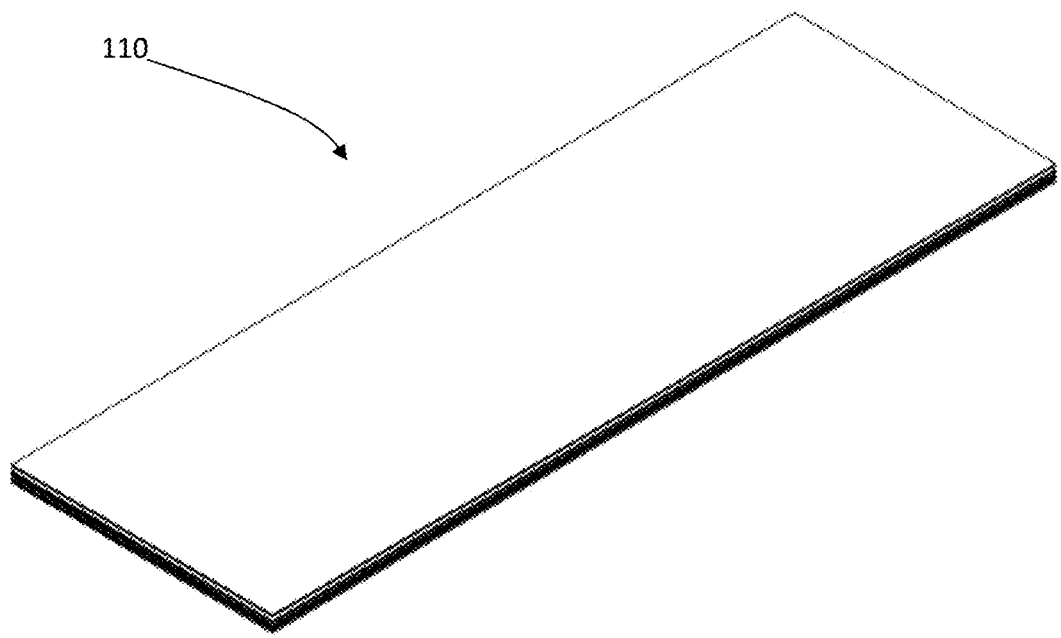
FIG. 8 is a front perspective view of a preferred embodiment of an IR heating panel.
Figure 9:
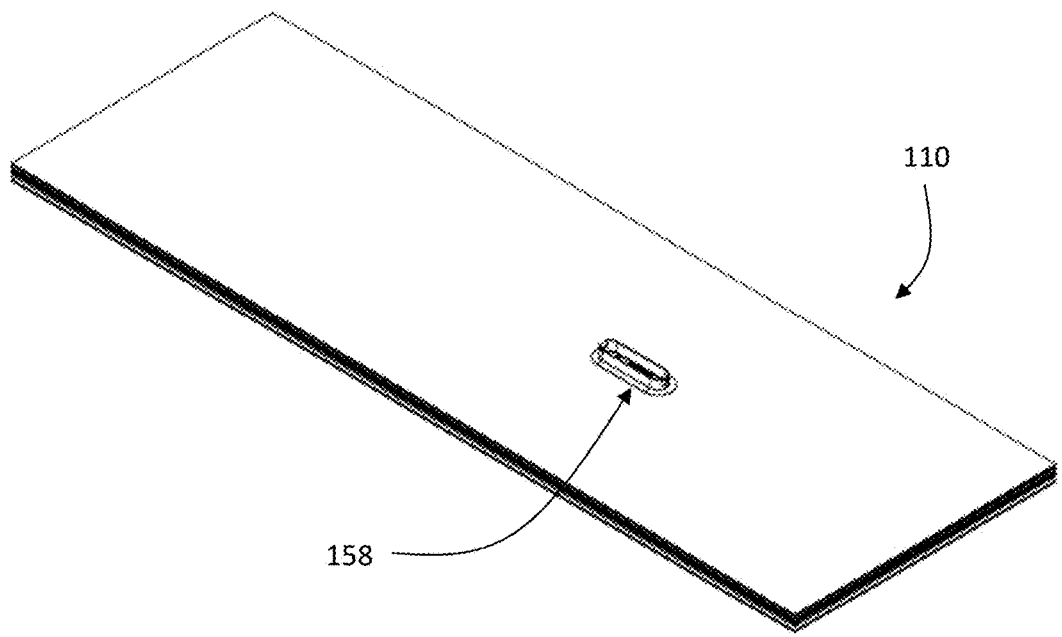
FIG. 9 is a back perspective view of a preferred embodiment of an IR heating panel.

One example of a sauna is illustrated in FIG. 7. The sauna 100 includes a plurality of heaters illustrated here in the form of infrared heating panels 110. It should be appreciated that the sauna 100 depicted in FIG. 1 is just one example of many possible designs. Saunas that employ electrically energized heaters generally utilize a series of individual infrared (IR) heating panels, designed to emit IR radiation into the sauna room. FIG. 8 illustrates a front perspective view of one form of an IR heating panel in an assembled configuration. FIG. 9 is a back perspective view of the same assembled panel exposing the shell 158 of a containment system that serves as an access point for conductors such as wires for accessing electric terminals such as solder points of the panel. Although the panel illustrated in FIG. 8, 9 is rectangular, the profile of the panel may assume a wide variety of sizes and shapes.

Figure 5:
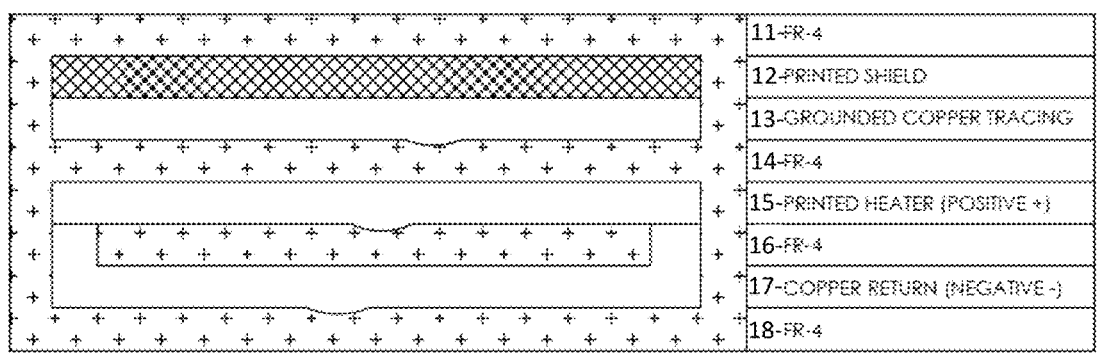
FIG. 5 illustrates various layers of materials utilized in a preferred embodiment of an IR heating panel.
Figure 10:
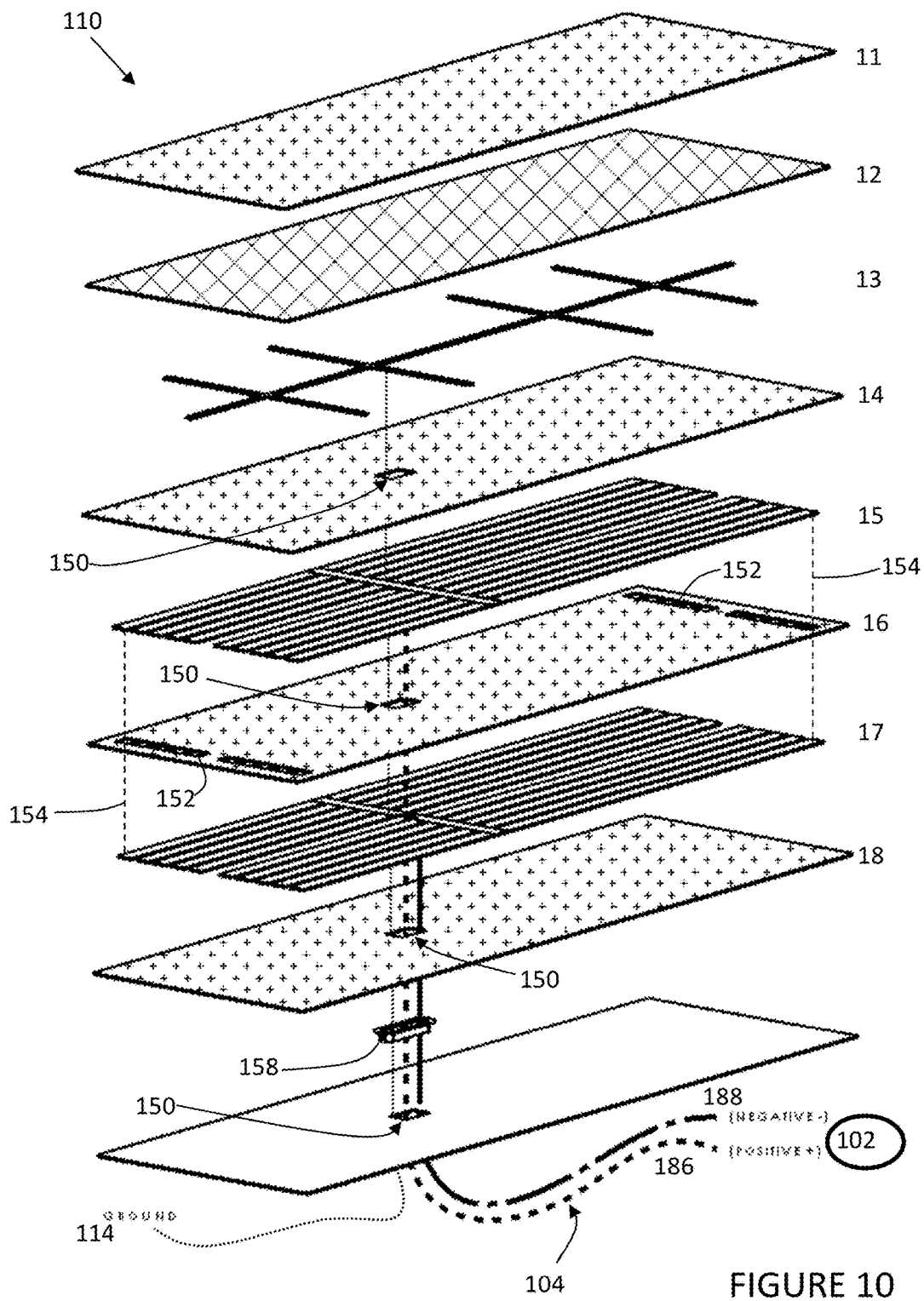
FIG. 10 is exploded view of the IR heating panel illustrated in FIG. 8 having a grounded shielding matrix and illustrating one form of associated wiring extending from a power source.

The IR heating panel in this embodiment comprises layers and features described previously in FIG. 5 and are illustrated in exploded view in FIG. 10. The numbered layers on the right side of FIG. 10 correspond to the layers numbered in FIG. 5. These include a black high heat non-conductive protective layer 11, a grounded EF printed shielding matrix layer 12, 13, an IR heating element layer 15, a return conductor layer 17 and finally a high heat non-conductive bottom protective layer 18, 19. Layers 14, 16 also represent high heat non-conductive protective layers. In certain embodiments, the high heat non-conductive material is a non-flammable, electrically and thermally insulating type material. One example of such material is FR-4 glass-reinforced epoxy, a material often used in printed circuit board (PCB) applications.

Figure 6:
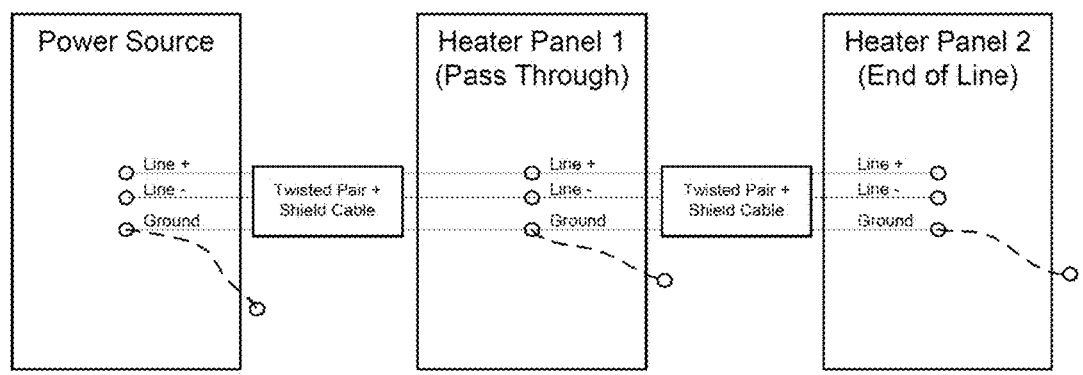
FIG. 6 is an illustration of a preferred embodiment of an uninterrupted twisted pair and ground wire extending from a power source through one or more IR heating panels until terminating at a final panel.

Each IR heating element is connected to a power source as illustrated earlier in FIG. 6. This power source is typically controlled by an electrical control system that is used to maintain room temperature and monitor for unacceptable over-temperature conditions.

During operation, power supplied to the IR heating elements corresponds to electric field (EF) generation. An electrically conductive shield 12 (also referred to as a shield, EF shield, printed shield, shielding layer, and as a shield layer) is situated as a printed overlay to the IR heating elements in an effort to shield or block the emitted electric field EF (V/m). The shield in use is intended to overlay the radiation emitters of the IR Heating panel 15 (termed as 'printed heater' in FIG. 5) and conductive power busses to effectively form an EF shielding plane. Earth ground must be electrically coupled to the shield 12 in order to create an effective EF shield. As just one example, the shield may be electrically coupled to a conductor within a power cord that is coupled to earth ground (e.g., through an electrical plug socket).

A closer view of a preferred embodiment of a printed heater element 15 is illustrated in FIG. 11. The heater in this embodiment comprises a series of IR heating elements 15 supported by a substrate 16 although in some embodiments only one element may be used. The heating elements 15 are configured to produce IR radiation when an electrical current is passed there through. In certain embodiments, the heater elements 15 may be encased within the substrate 16 or may be laid atop the substrate 16. In certain embodiments, the IR heating elements 15 can take the form of a carbon fiber circuit screen printed on the substrate 16, and in certain cases, can be semi conductive; however, the invention should not be limited to such.

The conductive shield (or shield) 12 can be constructed in multiple ways. In preferred embodiments, the conductive EF shield 12 comprises a printed layer that is situated above the IR heating elements. In other embodiments, the shield involves a weave configuration, such as dual-layered or single-layered shields. Such weaves can be coupled atop of the panel or adhered thereto so as to be maintained in a position substantially overlaying the IR heating elements 15. In certain embodiments, the weaves are positioned to entirely overlay the IR heating elements 15.

The printed shield resistivity relative to ground is controlled by specific electrical coupling to an underlying conductive grounding matrix. This may be accomplished by one or more techniques. For example, a conductive ink may be printed above or below a metallic surface, or a metallic surface is placed over a printed conductive ink, or metallic material is placed over metallic material within a heat compressed FR-4 or similar non-conductive material. In some embodiments the underlying conductive grounding matrix is a low resistive conductive material such as copper or aluminum foil, expanded metal mesh, or printed conductive materials such as printed copper on a PCB. The resistivity of the printed shield may be controlled by peripheral conducting grounding matrix materials such as those just mentioned. Semi-conductive materials exhibit variable electric resistance with current flow. Electrical Shielding therefore is accomplished by providing the opposing charge distributed on the semi-conductive material more evenly due to the low impedance paths to ground resulting from the grounded low impedance metallic peripheral. The opposing charge held in close proximity keeps the Electric Field (EF) enclosed within the IR heater thus satisfying Gauss's Law with an arbitrary surface enclosing the entirety of the IR heater.

FIG. 10 further illustrates a plurality of bypass apertures 150 in various layers of a heating panel 110. The apertures 150 generally align providing passage through the back side of the panel to at least the grounded tracing 13 layer. Transition apertures 152 through the non-conductive layer 14 provides passage of a transition conductor 154 extending between printed heater 15 and return 17. The transition conductor 154 is formed of a conductive material capable of completing the circuit between the heater 15 and return 17 such as copper strips.

At the back entry of heating panel 110 is a containment system for containing insulated and uninsulated conductors including a first 186 and second 188 insulated conductor and an uninsulated ground conductor. In preferred embodiments the conductors are in the form of wires. The ground 114 wire and wires from cord 104 supply electrical energy from power source 102. In preferred forms, the containment system comprises a shell 158. In an assembled configuration, the layers of the heating panel 11-18 are sandwiched together such that the terminal end of the power cord 104 wires attach just beyond the inner surface of shell 158 to various electrical terminals exposed in the shell.

In preferred embodiments, the shell 158 is in the form of an elongated rounded rectangle as illustrated in FIG. 14B. An interior wall 166 and an exterior wall 162 define potting aperture 168 extending through shell 158. Connections to electric terminals such as solder points are made through the potting aperture 168. Extending between interior wall 166 and exterior wall 162 is one or more supply portion openings for entry of a power cord 104 or ground wires or both. A second supply portion opening may be used to house wiring extending between a plurality of heating panels 110. In some embodiments the shell 158 may comprise a base wall 164 to serve as an attachment face for securing the shell 158 to an exposed surface on the heating panel as illustrated in FIG. 14 with a detail view illustrated in FIG. 15. The potting aperture 168 is sufficient in size to expose terminals for various layers within the heating panel 110 while not exposing any of these points beyond an outer edge of the base wall 164.

Figure 17:
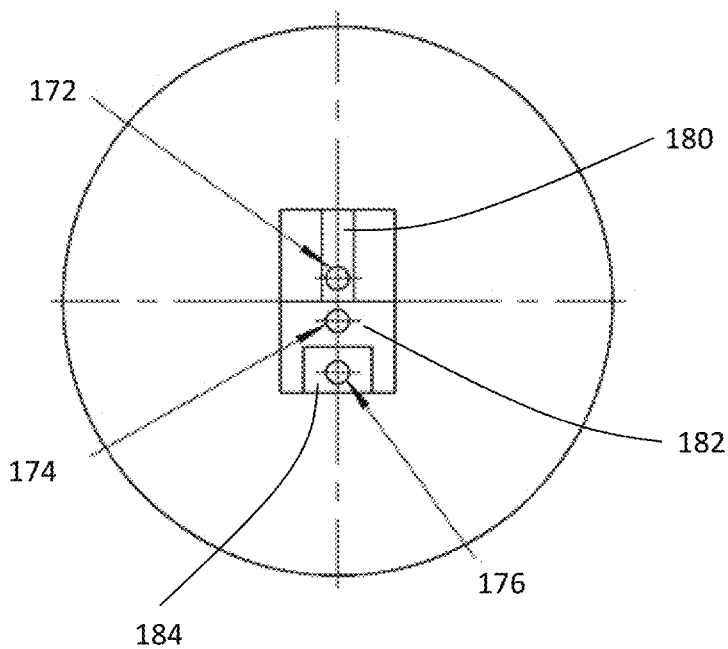
FIG. 17 is a back close up perspective view of one portion of the heating panel of FIG. 14 with the shell removed further illustrating the exposed busses and associated solder points.

In this embodiment, a first, second, and third terminal are in the form of three solder points 170 as illustrated in FIG. 15 (illustrated with a shell) and FIG. 16 (illustrated without a shell). The solder points 170 comprise a grounding solder point 172 extending from a grounding buss 180, a negative solder point 174 extending from a negative buss 182, and a positive solder point 176 extending from a positive or power buss 184. The grounding solder point 172 and buss 180 is located on the grounded copper tracing. Attachment of the ground wire (ground conductor) to the grounding solder point 172 (third terminal) provides a conduit for the copper tracing 13 to be grounded. The copper tracing 13 is in direct contact with the shielding layer 12. Electric field transmissions are absorbed by the shielding and transferred to the tracing for travel through the ground wire to ground 114. The power cord 104 includes a positive wire (first insulated conductor) terminating at the positive solder point 176 (first terminal) located on the positive buss 184 on the printed heater 15. A negative wire (second insulated conductor) in the power cord 104 terminates at the negative solder point 174 (second terminal) located on the negative buss 182 on the return 17. Each of these solder points 170 are illustrated in the detail view FIG. 17. Although each solder point appears to abut each other in the illustration, the solder points are separated by the non-conductive layers discussed and illustrated earlier in FIG. 10.

Alternative embodiments may include a printed shield verification point (not shown) which is a fourth point accessible through the potting aperture 168. This point is an accessible point on the shield 12 and is utilized during quality control to serve as electrical check points to evaluate the electrical condition between the shield 12 and grounding matrix 13. The Grounding Matrix is a conductive tracing that will be electrically in contact with the printed shield semi-conductive material. The grounding matrix provides a grid system of 0 ohms as measured to earth ground. This 0 ohms conductive matrix is always electrically in contact to the printed semi-conductive shield thereby ensuring a very low net shielded grid resistance density or in other words excellent EF shielding properties within the defined printed space.

Once all the solder point connections are made and the printed shield is verified, this solder point location will be encased and protected by a two-part epoxy. In preferred embodiments this is done by filling the potting aperture 168 with the epoxy.

Figure 18:
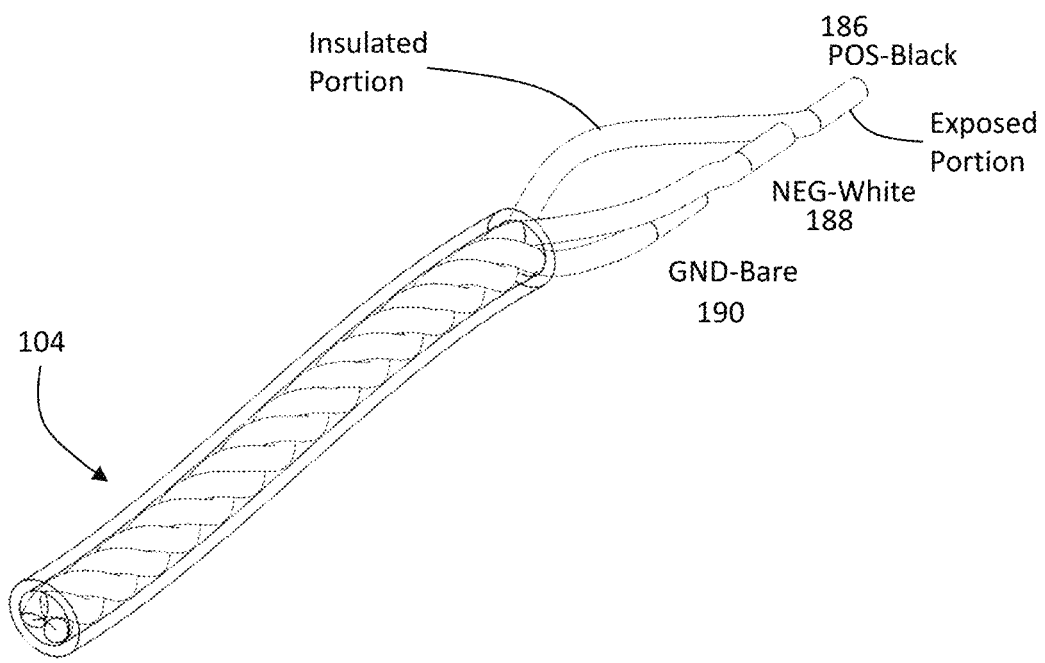
FIG. 18 is a partial perspective view of a preferred form of power cord illustrating a twisted pair configuration.

FIG. 18 illustrates a preferred form of a power feed from a power source 102 along a power cord 104. The power cord 104 comprises a twisted pair power feed wires typically including a black wire (first insulated conductor) to represent (+) a white wire (second insulated conductor) to represent (−) and a bare copper wire (uninsulated conductor) to represent the ground. Continuation of the twisted paired wire (black & white-color not shown) as it extends through the shell 158 reduces the levels of Electromagnetic Radiation (EMR) when voltage is present to push current in the lines (current flow). Current will flow through the wires when there is a resistive element at the end and a voltage to push the current (current flow). This is defined by Ohms Law where V=I*R in which V is voltage, I is current and R is load resistance. At any instant, current in the Black wire will be equal and in opposite direction to the current in the White wire unless there is leakage current to ground. Electromagnetic Radiation (EMR) is defined by a force caused by current flow in the wires. These forces, although small, are represented by a vector with a magnitude and direction. Forces in equal and opposite directions (vectors) will tend to cancel each other out thereby reducing EMR. Maintaining the configuration of the twisted paired wires at and past the multiple solder points retains this benefit.

Figure 19:
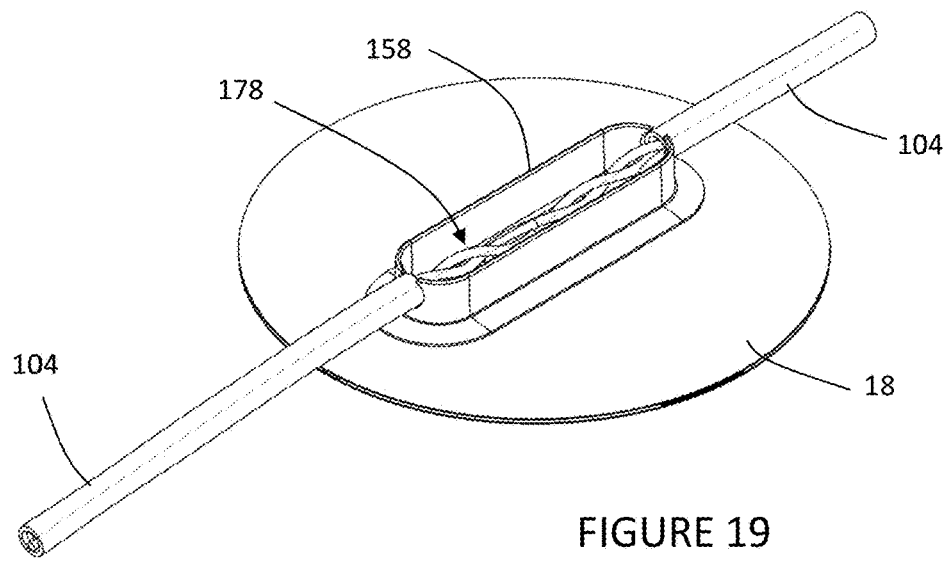
FIG. 19 is a partial back perspective view of a power cord extending completely through a shell in a preferred embodiment of a pass through solder point configuration.
Figure 20:
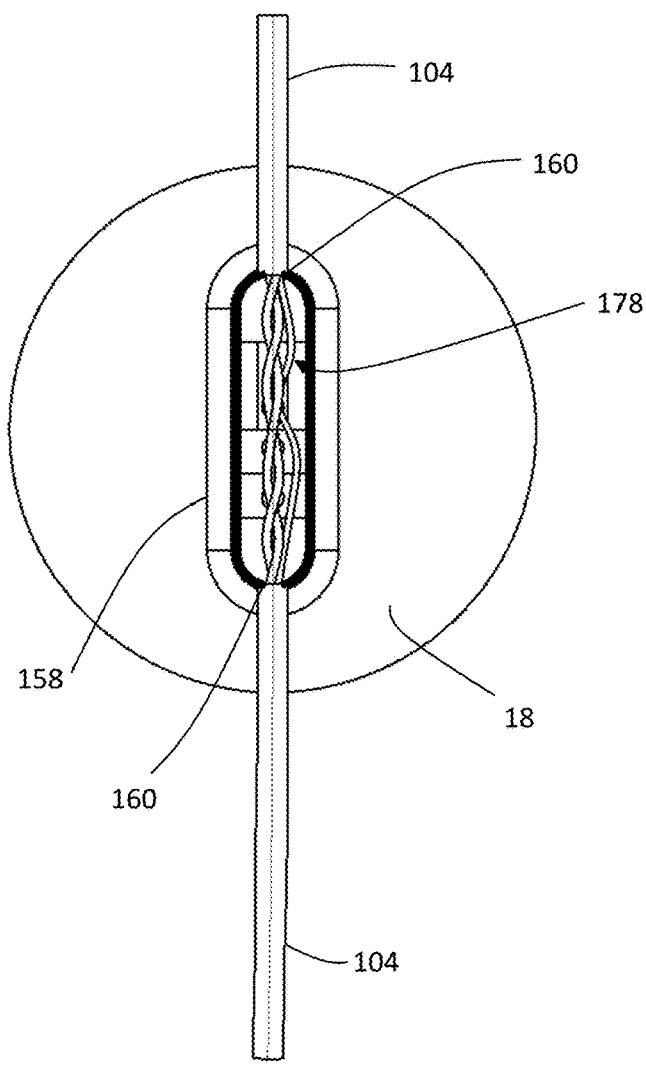
FIG. 20 is a partial back view of the device illustrated in FIG. 19.

The twisted pair 178 wiring configuration is further illustrated in FIGS. 19 and 20. This embodiment is representative of a shell 158 with a power cord 104 entering and exiting the shell through a supply portion opening 160. This configuration is utilized when power is extended to two or more heating panels 110. In this case three individual conductors here in the form of wires, one each for the positive, negative, and ground extend from an electrical plug (not shown) drawing electrical power from the power source 102. The wires extend from one heating panel 110 to another until reaching an endpoint heater panel. The outer power cord insulation and other shielding within the power cord 104 is removed to expose the two insulated twisted pair wires 178 and the bare ground. A section of insulation covering each of the twisted pair wires 178 is removed to expose the wire for soldering to the respective solder points 170. The section of insulation removed is sufficient for soldering while still insulating portions of the twisted pair that might cause an electrical short. This pass through wiring method eliminates the need to cut the twisted pair thereby retaining wire strength and reducing by ½ the number of wires requiring to be joined at the solder points. This method also provides for tighter wire twisting and for eased soldering of the exposed bare wire segments to the solder point electrical terminals without significant interruption of the twisted configuration. Once the ground wire is soldered to grounding solder point 172 and the negative wire is soldered to the negative solder point 174 and the positive wire is soldered to the positive solder point (FIG. 17), the potting aperture 168 is filled with epoxy.

Figures 21, 22:
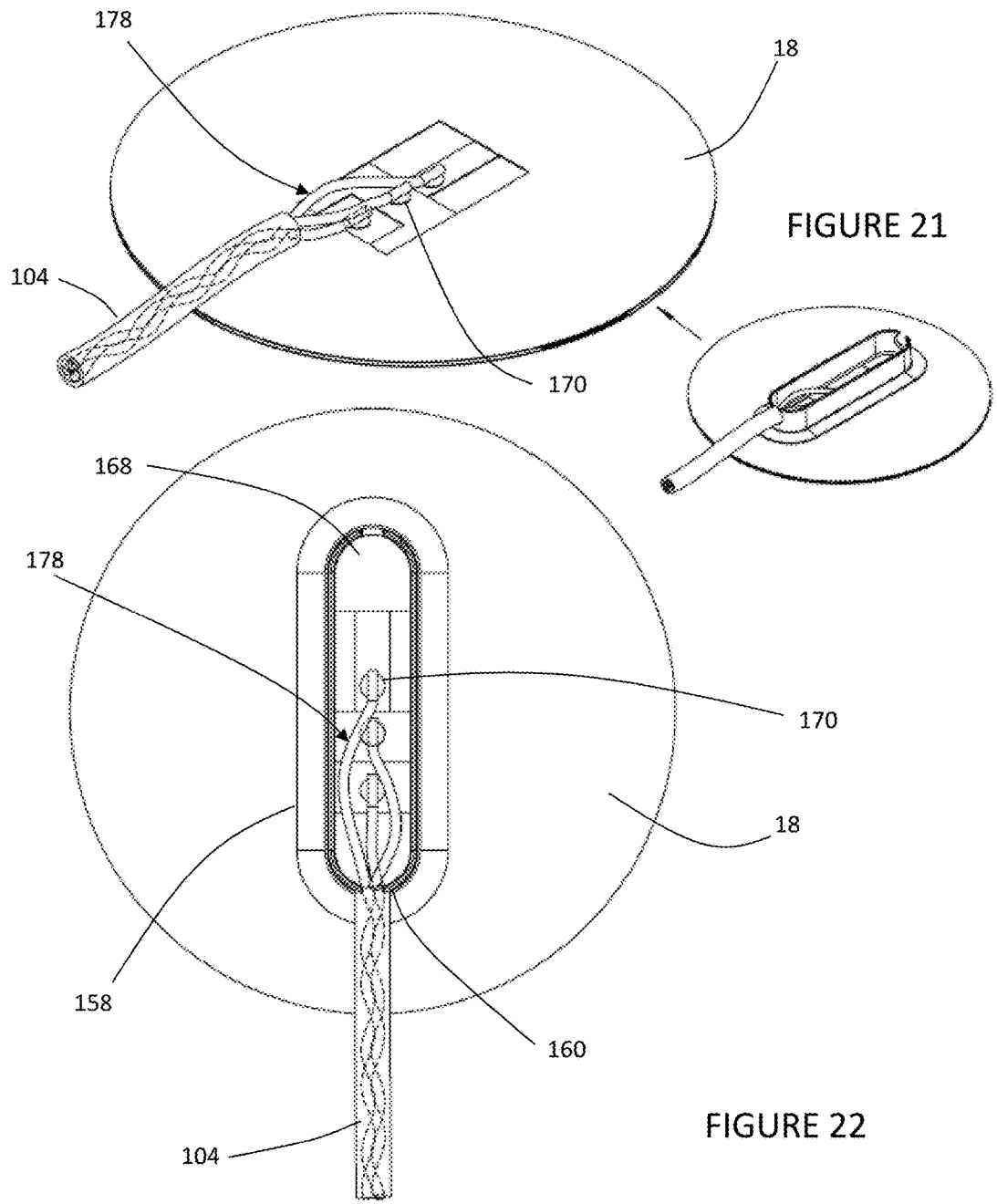
FIG. 21 is a partial back perspective view of the termination of the twisted pair soldered to solder points with shell included on right and removed on left as used at a terminal heating panel.
FIG. 22 is a partial back view of the termination of the twisted pair as illustrated previously in FIG. 21.

FIG. 21 (shell removed on left) and FIG. 22 illustrates the twisted pair 178 as it terminates at an endpoint heater panel 110. Embodiments utilizing only a single heating panel will not necessitate the use of the pass through wiring illustrated in FIG. 19 due to the only heating panel serving as the endpoint panel. In this endpoint heater panel, the power cord 104 enters the shell 158 through the supply portion opening 160. The outer cord insulation is removed along with additional shielding in the cord if present. An insulated portion of the twisted pair 178 wires extends into the shell 158. The terminal portions of the twisted pair are stripped of insulation and soldered to their respective solder points 170 as described earlier. The potting aperture is filled with epoxy.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An infrared (IR) heating panel for a sauna, comprising:
   a thermally and electrically insulating substrate supporting a plurality of material layers of an IR heating panel;
   an IR heating element emitting IR radiation with passage of electrical current therethrough;
   a power buss distributing electrical power to said IR heating element;
   a semi-conductive printed shield shunting electrical field charges from a sauna user;
   said semi-conductive printed shield substantially covering said IR heating element and said power buss;
   said IR heating element electrically coupled to said power buss;
   said IR heating element supported by said substrate;

a return element for returning electrical current from said IR heating element to said power buss;
said return element electrically coupled to said power buss and said IR heating element;
said return element supported by said thermally and electrically insulating substrate;
said return element substantially parallel to said respective IR heating element;
said return element proximal to said IR heating element;
said IR heating element disposed between said printed shielding layer and said substrate;
wherein said IR heating element, said power buss, and said return element are coupled as an electrical circuit;
a grounded metal tracing in direct contact with said semi-conductive printed shield;
said grounded metal tracing in the form of a 0 ohm grid matrix;
wherein electric field transmissions absorbed by said semi-conductive printed shield are transferred to said grounded metal tracing.

2. The IR heating panel of claim 1 wherein said IR heating element has a higher electrical resistance than said one return element.

3. The IR heating panel of claim 1 wherein said return element comprises a IR heating element for emitting IR radiation from both said IR heating element and said return element.

4. The IR heating panel of claim 3 wherein said semi-conductive printed shield is configured to shunt electrical field charges emitted from said IR heating element and said return element.

5. The IR heating panel of claim 3, further comprising a second shielding layer positioned between said return element and said substrate for shunting electrical field charges emitted by an IR heating element.

6. The IR heating panel of claim 1 wherein said IR heating panel comprises a plurality of IR heating elements spaced across said substrate.

7. The IR heating panel of claim 1 wherein said IR heating element comprises semi-conductive carbon.

8. The IR heating panel of claim 1 wherein said shielding layer is operatively coupled to said substrate and electrically coupled to an earth grounding matrix.

9. The IR heating panel of claim 8, wherein the shielding layer comprises a printed layer electrically coupled to an earth grounding matrix.

10. An infrared (IR) heating panel comprising:
a thermally and electrically insulating substrate supporting a plurality of material layers of an IR heating panel;
an IR heating element emitting IR radiation with passage of electrical current therethrough;
a power buss distributing electrical power to said IR heating element;
a conductive or semi-conductive printed shield shunting from a sauna user electrical field charges emitted by said heating element and said power buss;
a return element returning electrical current from said IR heating element to said power buss;
said IR heating element electrically coupled to said power buss;
said return element electrically coupled to said power buss;
said IR heating element supported by said substrate;
said return element electrically coupled to said IR heating element;
said conductive or semi-conductive printed shield substantially covering said IR heating element and said power buss;
wherein said IR heating element, said power buss, and said return element are coupled as an electrical circuit;
a grounded metal tracing in direct contact with said conductive or semi-conductive printed shield;
said grounded metal tracing in the form of a 0 ohm grid matrix;
wherein electric field transmissions absorbed by said conductive or semi-conductive printed shield are transferred to said grounded metal tracing.

11. The IR heating panel of claim 10 wherein the printed shield resistivity relative to ground is controlled by material of grounded metal tracing.

12. The IR heating panel of claim 11 wherein the underlying conductive grounding matrix is a low resistive conductive material.

13. The IR heating panel of claim 12 wherein the low resistive conductive material is copper or aluminum foil.

14. The IR heating panel of claim 12 wherein the low resistive conductive material is one or more of an expanded metal mesh and a printed conductive material on a printed circuit board.

15. An infrared IR heating panel system comprising:
a first IR heating panel for creation of IR heat;
a second IR heating panel for creation of IR heat;
one or more of said first IR heating panel and said second IR heating panel comprising a semi-conductive printed shield;
a grounded metal tracing in direct contact with said semi-conductive printed shield;
said grounded metal tracing in the form of a 0 ohm grid matrix;
wherein electric field transmissions absorbed by said semi-conductive printed shield are transferred to said grounded metal tracing;
a power feed conductor for transferring energy from a power source to a plurality of heating panels;
a first insulated conductor for providing current originating from a positive terminal of a power source;
a second insulated conductor for providing current originating from a negative terminal of a power source;
a third conductor for serving as a ground;
electrical terminals on said first IR heating panel for joining with said first and second insulated conductors;
electrical terminals on said second IR heating panel for joining with said first and second insulated conductors;
an electric plug;
said electric plug electrically coupled to said first and second and third insulated conductor for transferring energy from a power source;
said power feed conductor comprising said first insulated conductor, said second insulated conductor, and said third conductor therein;
wherein at least said first insulated conductor and said second insulated conductor are intertwined forming a twisted pair;
and wherein said twisted pair conductors extend without interruption from said electric plug to electrical terminals on said first IR heating panel and to electrical terminals on said second IR heating panel without interruption of the conductor.

16. The IR heating panel system of claim 15 further comprising a containment system wherein a portion of said power feed conductor is positioned in said containment system surrounding said electrical terminals.

17. The IR heating panel system of claim 16 wherein said containment system is filled with an epoxy material to entomb said electrical terminals and conductors.

18. The IR heating panel system of claim 15 wherein electrical conductors within said twisted pair are wires.

19. The IR heating panel system of claim 18 wherein the twisted pair wires further comprise bare wire exposure of the twisted pair wires for solder point connections to said electrical terminals without interruption of the twisted configuration of the twisted pair.

20. The IR heating panel system of claim 18 further comprising a first solder point on said IR heating panel and wherein a segment of the insulation of said first insulated conductor wire is removed for facilitating soldering bare portion of said wire to said first solder point.

* * * * *